(12) United States Patent
Thompson et al.

(10) Patent No.: US 9,843,761 B2
(45) Date of Patent: Dec. 12, 2017

(54) SYSTEM AND METHOD FOR BRIGHTENING VIDEO IMAGE REGIONS TO COMPENSATE FOR BACKLIGHTING

(71) Applicant: Polycom, Inc., San Jose, CA (US)

(72) Inventors: Edmund Thompson, Burlington, MA (US); Yibo Liu, Boxborough, MA (US)

(73) Assignee: Polycom, Inc., San Jose, CA (US)

( * ) Notice: Subject to any disclaimer, the term of this patent is extended or adjusted under 35 U.S.C. 154(b) by 0 days.

(21) Appl. No.: 15/017,262

(22) Filed: Feb. 5, 2016

(65) Prior Publication Data

US 2016/0234455 A1    Aug. 11, 2016

Related U.S. Application Data

(60) Provisional application No. 62/112,525, filed on Feb. 5, 2015.

(51) Int. Cl.
*H04N 5/57* (2006.01)
*H04N 7/15* (2006.01)
*G06K 9/00* (2006.01)

(52) U.S. Cl.
CPC ............... *H04N 5/57* (2013.01); *H04N 7/152* (2013.01); *G06K 9/00255* (2013.01)

(58) Field of Classification Search
CPC combination set(s) only.
See application file for complete search history.

(56) References Cited

U.S. PATENT DOCUMENTS

| 8,648,885 | B2* | 2/2014 | Lee | G09G 3/2003 |
|---|---|---|---|---|
| | | | | 345/690 |
| 2006/0071936 | A1* | 4/2006 | Leyvi | G09G 3/342 |
| | | | | 345/589 |
| 2007/0076957 | A1* | 4/2007 | Wang | G06K 9/00234 |
| | | | | 382/195 |
| 2008/0055228 | A1* | 3/2008 | Glen | G09G 3/3406 |
| | | | | 345/102 |
| 2008/0152245 | A1* | 6/2008 | El-Maleh | H04N 21/4621 |
| | | | | 382/254 |
| 2011/0069906 | A1* | 3/2011 | Park | G06T 5/50 |
| | | | | 382/284 |
| 2012/0050565 | A1* | 3/2012 | Imai | H04N 5/23293 |
| | | | | 348/224.1 |
| 2012/0224019 | A1* | 9/2012 | Samadani | H04N 7/142 |
| | | | | 348/14.01 |

(Continued)

*Primary Examiner* — Duc Nguyen
*Assistant Examiner* — Assad Mohammed
(74) *Attorney, Agent, or Firm* — Blank Rome, LLP

(57) ABSTRACT

A videoconferencing system includes at least one processor and at least one camera. The endpoint can capture one or more images with the camera. The system can locate a region of interest within an image, such as the area surrounding the face of a person participating in a videoconference. If the face area or other region of interest is too dark, the system can brighten the region to make it more visible. The system can determine whether the face is too dark by comparing the captured image to previously captured images, or comparing the luma values and other data making up the face to predetermined values, or both. The system can check the modified image for over-brightening or saturation, and further adjust the image as needed. The brightening of the face area is done in such a way that the brightened region is unobtrusive to the viewer.

21 Claims, 5 Drawing Sheets

(56) References Cited

U.S. PATENT DOCUMENTS

| | | | |
|---|---|---|---|
| 2013/0128080 A1* | 5/2013 | Hsu | H04N 5/2351 |
| | | | 348/234 |
| 2014/0063178 A1* | 3/2014 | Krans | H04N 7/142 |
| | | | 348/14.08 |
| 2015/0310641 A1* | 10/2015 | Purdy | G01R 33/565 |
| | | | 382/131 |

* cited by examiner

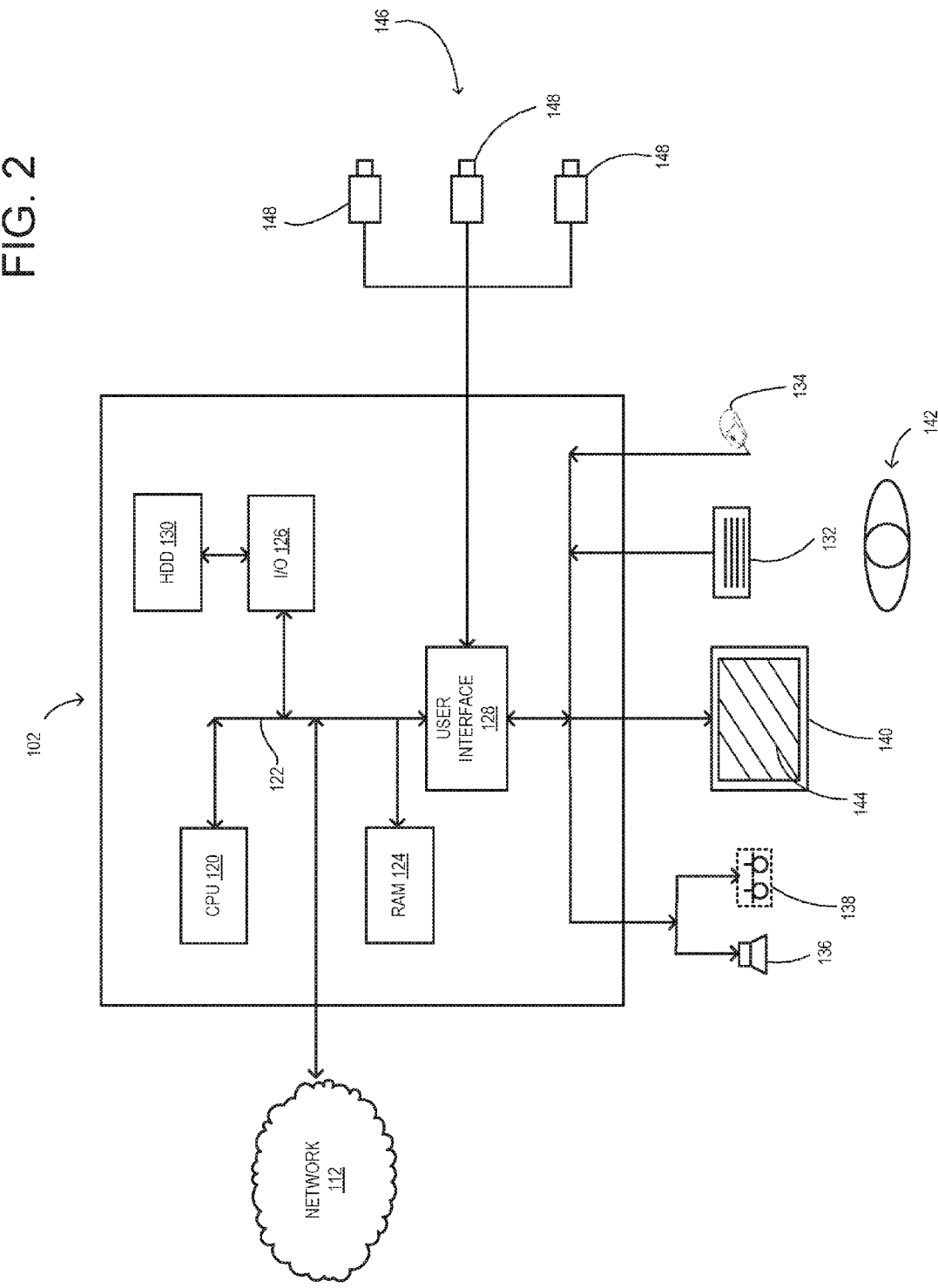

SYSTEM AND METHOD FOR BRIGHTENING VIDEO IMAGE REGIONS TO COMPENSATE FOR BACKLIGHTING

CROSS-REFERENCE TO RELATED APPLICATION

This application claims priority benefit of U.S. Provisional Application No. 62/112,525 filed Feb. 5, 2015, entitled "Face Brightening to Compensate for Back-Lighting," the contents of which are entirely incorporated herein.

FIELD OF THE DISCLOSURE

This disclosure relates to video-conferencing and in particular to brightening regions within video-conferencing images to correct for darkness. The darkness in the regions to be brightened can be the result of backlighting, and other factors in the environment from which visual information is collected.

BACKGROUND

Videoconferences can involve transmission of video, audio, and other types of information between two or more videoconference locations, or between two or more videoconference participants. Generally, a videoconferencing endpoint at each participant's location will include one or more cameras for capturing images of the local participant and one or more display devices for displaying images of remote participants. The videoconferencing endpoint can also include one or more additional display devices for displaying digital content. When more than two endpoints participate in a videoconferencing session, a multipoint control unit (MCU) can be used as a conference controlling entity. The MCU and endpoints typically communicate over a communication network, with the MCU receiving and transmitting video, audio, and data channels from and to the endpoints.

In videoconferencing (and in other applications where images of people are taken or recorded), faces are often too dark in comparison to other regions in images. Unwanted darker regions can occur when a person faces away from a window, lamp, or other bright light source, while the camera collects image data of both the person and the light source. In this situation, a camera device can attempt to compensate for the brightness of the light source by using a small aperture or a short exposure (or both). The smaller aperture or shorter exposure time can in turn cause the face region to be underexposed, and thus comparatively dark, sometimes to the point that the face region is barely recognizable.

There have been attempts to correct these problems, none of which is completely satisfactory. A partial solution is to increase the exposure time for the camera. This technique has been used in a variety of applications, including video-conferencing systems, web cameras, digital video and still image cameras. This solution is, however, frequently inadequate. For example, some web cameras do not allow external software (such as that running on a personal computer or videoconferencing system) to control their exposure settings. Moreover, even when the camera is able to increase exposure time, this can cause an image to be partially washed-out. That is, while collecting more light may make a face region visible, it can cause the remainder of a region to be too bright, even to the point of making it non-visible. Thus, there is room for improvement in the art.

SUMMARY

Methods, devices and techniques for correcting or compensating for underexposed regions within images are disclosed herein. Although examples discussed in this disclosure refer primarily to faces and videoconferencing, it should be understood that this is done for the convenience of the reader. The methods, devices and techniques described can be applied to other objects such as the head, the upper body, or any underexposed region, and to other image and video data collection situations, such as image processing or video streaming, for example.

The methods and algorithms set forth herein enable darkness correction while minimizing the computational resources required. These and other aspects of the disclosure will be apparent in view of the attached figures and detailed description.

The foregoing summary is not intended to summarize each potential embodiment or every aspect of the present disclosure, and other features and advantages of the present disclosure will become apparent upon reading the following detailed description of the embodiments with the accompanying drawings and appended claims. Although specific embodiments are described in detail to illustrate the inventive concepts to a person skilled in the art, such embodiments are susceptible to various modifications and alternative forms. Accordingly, the figures and written description are not intended to limit the scope of the inventive concepts disclosed in any manner.

BRIEF DESCRIPTION OF THE DRAWINGS

Embodiments of the present invention will be understood and appreciated more fully from the following detailed description, taken in conjunction with the drawings in which:

FIG. 2 depicts an exemplary videoconferencing endpoint in which the coding techniques and methods described herein can be implemented;

DETAILED DESCRIPTION

At least one embodiment of this disclosure is a videoconferencing endpoint which includes a processor, and at least one camera, coupled to (in signal communication with) a non-transitory computer readable storage medium which is also coupled to the processor, and a display device.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments can implement the features and functionality described herein in software, firmware, or hardware as desired, including any combination of software, firmware, and hardware.

Within this disclosure, the terms "luma" and "chroma" have the meanings generally understood by persons of skill. The term "luma" can correspond to the brightness in an image, and/or to refer numerical values assigned to a region making up an image, such as a pixel, to cause a certain level of brightness for that pixel. The terms "chroma" or "chrominance" can correspond to the coloration in an image, and/or refer numerical values assigned to a region making up an image such as a pixel to cause a color for that pixel.

As noted above, a common problem in videoconferencing is that a conference participant has a lamp, window, or other bright light source behind him and within the field of view of the camera. Likewise, as is common in a typical office environment, there may be light source overhead, which can create a shadow effect on a person's face. When the camera computes the exposure required for the scene, a frequent result is that the face is underexposed, rendering the image of the persons face darker than the rest of the scene. This is disadvantageous, not only because it is aesthetically displeasing, but also because it can make it difficult or impossible for the other participants to read the facial expression of such a participant, negating a key advantage of videoconferencing over telephonic communication. To overcome these disadvantages, it is desirable to brighten the image of the participant's face (and optionally the area around the face), without changing the exposure settings of the camera, which, as noted above, may not be possible in all cases, or which can result in other undesirable effects, such as washing out the remainder of the image. Simply put, it is desirable to ensure that all parts of an image are sufficiently viewable.

Turning now to the figures, in which like numerals represent similar elements throughout the several views, embodiments of the present disclosure are described.

Figure 1:
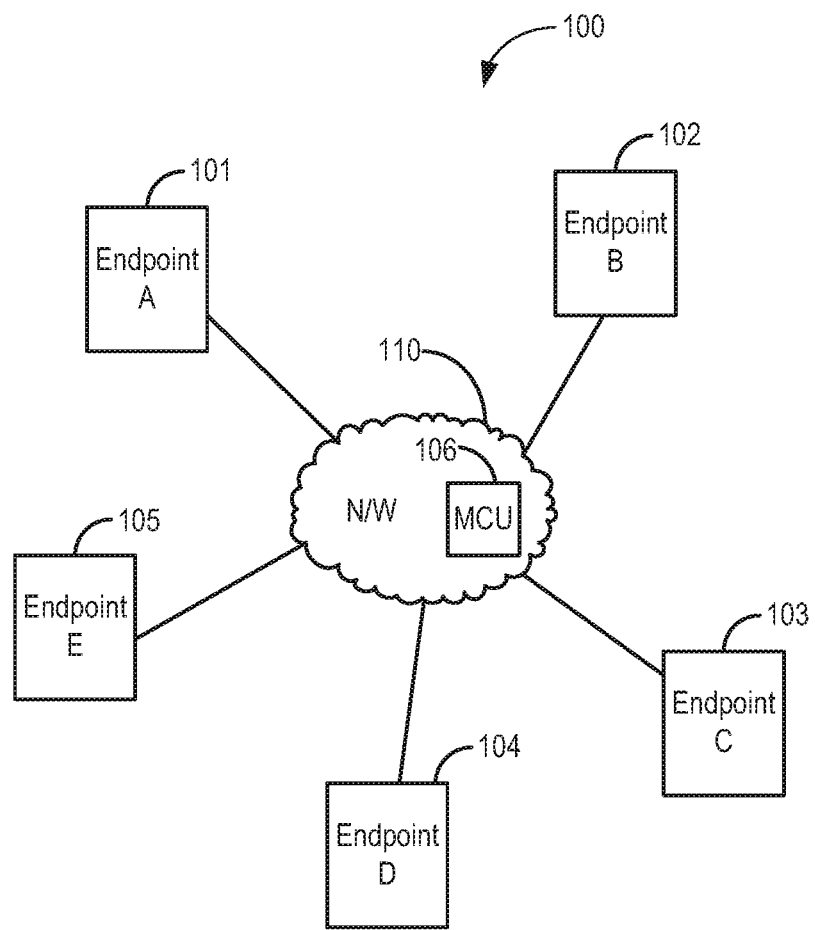
FIG. 1 depicts an exemplary multipoint videoconferencing system in which the methods and coding techniques described herein can be used.

FIG. 1 depicts an exemplary multipoint videoconferencing system 100 which can be used to carry out methods of this disclosure. System 100 can include network 110, one or more multipoint control units (MCU) 106, and a plurality of endpoints A-E 101-105. Network 110 can be, but is not limited to, a packet switched network, a circuit switched network, or a combination of the two. Endpoints A-E 101-105 may send and receive both audio and video data. Communications over the network can be based on communication protocols such as H.320, H.324, H.323, SIP, etc., and may use compression standards such as H.263, H.264, or H.265, for example. MCU 106 can initiate and manage videoconferencing sessions between two or more endpoints. Generally, MCU 106 can mix audio data received from one or more endpoints, generate mixed audio data, and send mixed audio data to appropriate endpoints. Additionally, MCU 106 can receive video streams from one or more endpoints. The MCU 106 may combine video streams. Video streams, combined or otherwise, may be sent by the MCU 106 to appropriate endpoints to be displayed on their respective display screens. As an alternative, MCU 106 can be located at any one of the endpoints A-E 101-105.

FIG. 2 depicts an exemplary videoconferencing endpoint 102 which can use and implement methods of this disclosure. Exemplary endpoint 102 may comprise any endpoint 101-105 within the system, and may comprise more than one endpoint 101-105. An endpoint 101-105 may comprise any suitable device that facilitates communication between remote parties. Exemplary endpoints 101-105 can include, but are not limited to conference phones that facilitate audio communication between remotely located participants and/or videoconference endpoints that facilitate simultaneous two-way video and audio transmissions between remotely located participants. An endpoint can also include a desktop computer configured with at least a speaker and a microphone and capable of audio communications, and a handheld device such as a mobile phone or tablet computer.

In the embodiments, the exemplary endpoint 102 may include a central processing unit (CPU) 120, such as a microprocessor, and a number of other components interconnected via a system bus 122. The CPU 120 is capable of operating and running an operating system. In some embodiments, the endpoint 102 may include a Random Access Memory (RAM) 124, an I/O adapter 126, and a user interface adapter 128. The I/O adapter 126 can connect peripheral devices, such as a disk storage unit 130 to the bus 122. The user interface adapter 128 can connect user interface devices such as a keyboard 132, mouse 134, speaker 136, and microphone 138, remote control (not shown), etc. to the bus 122. The endpoint 102 may additionally include a display device, such as a display monitor 140 coupled to the bus 122. The display device 140 may provide video data, status indications, and other data to a user 142. In some embodiments, a screen 144 of the display device 140 may comprise a touchscreen. The endpoint 102 can include more than one display device.

As illustrated in FIG. 2, in the embodiments, one or more cameras 148, such as array 146, at each endpoint 101-105 can capture near end endpoint video during a videoconference session for generating one or more video data streams (including, but not limited to, sequences of images). While array 146 in FIG. 2 includes three cameras 148, the array 146 may comprise fewer or additional cameras. For example, the array 146 may comprise five or more cameras 148 or may have only a single camera. Each camera 148 may comprise a pan-tilt-zoom (PZT) camera, in which panning, tilting, and zooming, and adjusting the focal length, are controlled by the user 142 via the CPU 120, or other component of the endpoint 102. CPU 120 can control orientation, positioning and repositioning, and the settings of the cameras 148. In some embodiments, CPU 120 can simultaneously control a Field Of View (FOV) of the array 146.

Figure 3A:
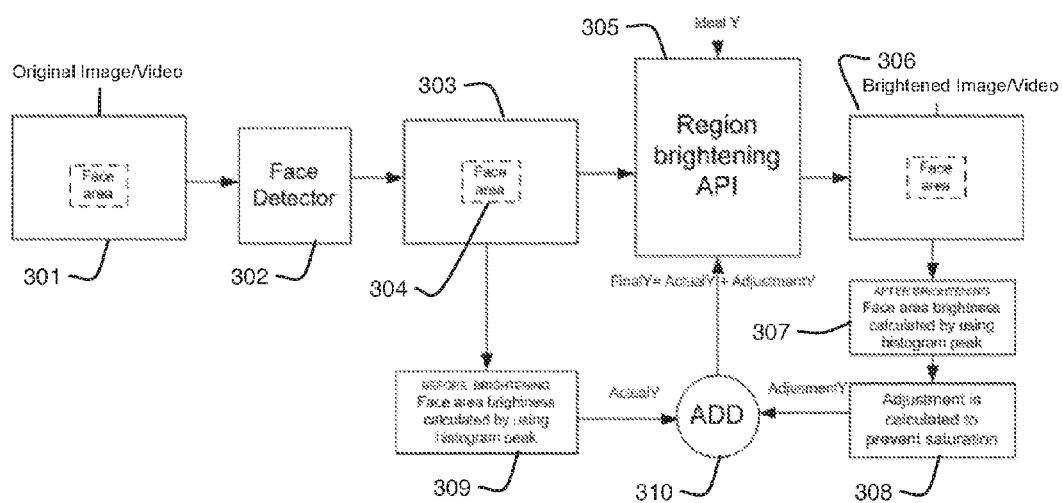
FIGS. 3A-B depict block diagrams of systems for correcting for backlighting in images in accordance with embodiments of this disclosure.
Figure 3B:
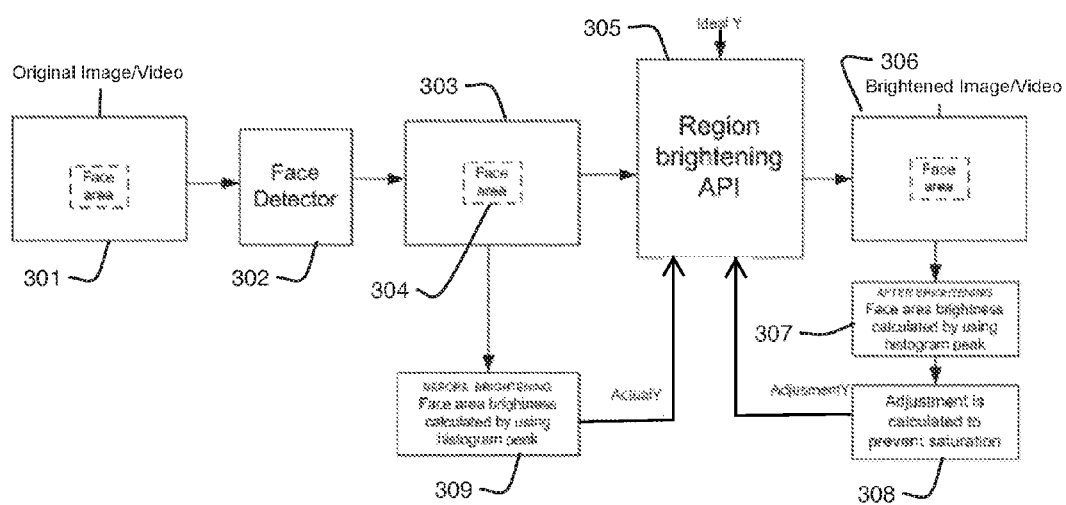

FIG. 3A is a block diagram of a system for brightening faces or other suitable portions of an image. To brighten the image of a participant's face, it is first necessary to find the face in the image. An image (or images) are received 301. The image or picture (or picture sequence) 301 can be submitted to a face detector for examination. The detector can detect 302 a face (or other relevant object, such as a person's upper body). CPU 120 of videoconferencing system 102 can run or execute suitable face detection algorithm. Upon finding or locating a face area 304, the face area's position and size are determined, and the face area's luma value is calculated 309. Based on the face area's luma value(s), and possibly based on information from preceding pictures 303, region brightening API 305 can determine whether to brighten the face area 304 and, if so, by how much. As will be described in greater detail below, API 305 can brighten and compose a modified image by changing the luma values in the region of interest according to one or more algorithms. This brightening can give a spotlight effect to the user's face. As will be discussed in detail below, the brightening effect can be appropriately attenuated so that the transition from the brightened area is smooth and the brightening effect is unobtrusive. A modified image 306 containing the brightened face area can be examined to provide information feedback for use on subsequent pictures, as discussed in greater detail below (307, 308, 309). The brightness of the modified image can be calculated 307 (with referenced to a histogram, for example). As an example of overall cross-checking of the brightening/modification process, adjustment values based on the modified image can be calculated 308, in order to prevent oversaturation. The adjustment values (e.g., AdjustmentY) can be added (or summed with) the values for the original area of interest (ActualY). The resulting image will therefore have a face area that is brighter than before. In order to prevent oversaturation (e.g., the facial region having been made too bright), the resulting image (FinalY) can be run through API 305 again, and the resulting image 306, analyzed again (307, 308, 309). In an alternate embodiment (see FIG. 3B), AdjustmentY is fed into API 305 separately from ActualY to enable more accurate control of the brightening process. In this case, only the modified image may be provided (displayed) to the system user.

In some embodiments, it is possible to apply full brightening to the face region 304, and lesser amounts for the surrounding area. In such embodiment, the brightening tapers off for pixels progressively farther from the face. This makes brightening of the face less obtrusive and produces a more aesthetically pleasing image. Additionally, it is possible to apply less brightening where the luma values are already higher than would be expected on the detected face. Application of less brightening as appropriate, combined with brightening only part of the picture, avoids making the picture too light. Additionally, in some embodiments, it is possible to brighten face region 304 by increasing the luma for selective pixels. In some embodiments, chroma values and their corresponding luma values can be scaled by the same factor.

If the picture (or the face region 304) is too dark, the face detector 303 might fail to find a face. Therefore, periodically (for example, every other frame) a brightened copy of the picture 301 can be created for use by the face detector 303. Initially, face detector 303 or API 305 may use fixed brightening parameters because information about the face is unavailable. The system 300 can brighten an image based in part on information about a detected face (or other region) within an earlier image. In at least one embodiment, determining the amount of face brightening to apply, involves first determining the most common luma value in the face area, using a histogram 309. For example, overall face brightness can correspond to the luma value at peak of a histogram of a facial region, an area of such a histogram, or other suitable measures. In some embodiments, it may be appropriate to adjust the brightness value, if for example previous brightening was excessive. It is possible to conduct this "over-brightness check" in various ways, including, for example, by computing the most common value for the face area after brightening. Additionally, in some embodiments, it may be desirable to apply some sort of temporal smoothing to the brightening level so that the brightening does not fluctuate excessively, which would be distracting to viewers.

The adjusted face area luma value 309 ("Actual") is one of at least two parameters that can be used for the next stage of the face brightening arrangement. A second parameter ("Desired" or IdealY) represents the desired replacement luma values for a brightened image. A table (set) of scale factors, one for each possible luma value, using these values can be created. The first (Actual+1) entries of this table will have the same value. The value of each entry is determined or assigned such that an input of Actual will result in an output of Desired. Subsequent entries gradually decrease in value, going down to zero for the last entry. In this way, it is possible to maintain the relative contrast for the darker parts of the image (up to Actual) and have smaller relative contrast for the lighter parts of the image.

In a 4:2:0 image, for example, a region in a picture that is to be brightened can be subdivided into groups of 2-by-2 luma blocks along with their corresponding chroma values. The average of these four luma values can be used as an index for the table described in the previous paragraph. The one or more table entries can be used as the scaling factor for pixels in an area, such as an area including the face, for example. The scaling factor can be attenuated for nearby areas, such that the brightening effect lessens gradually for pixels farther from the face. At least one embodiment uses the same scaling factor for all of the values in a relevant group. The following equation can be used to compute output pixel values:

$$Output = Input + (Input - Base) * Scale \qquad (1)$$

In equation 1, Input can be the input pixel value, Output can be the output pixel value, scale can be the scaling factor described above, and Base can be 16 in the case of luma values, and 128 for chroma. If a luma value is less than 16, the Output can be set to equal Input. Alternatively, Input can be set to actual input plus 16, so as to avoid negative values. In this context, if any computed value is outside the range of allowed pixel values, the computed value can be replaced by the closest allowed value. Replacing computed values with a nearest allowed value can be referred to as "clipping." In at least one embodiment, in order to avoid increasing color saturation in bright areas, chroma values in a given area are not changed if any of the luma values for that area are clipped.

Figure 4:
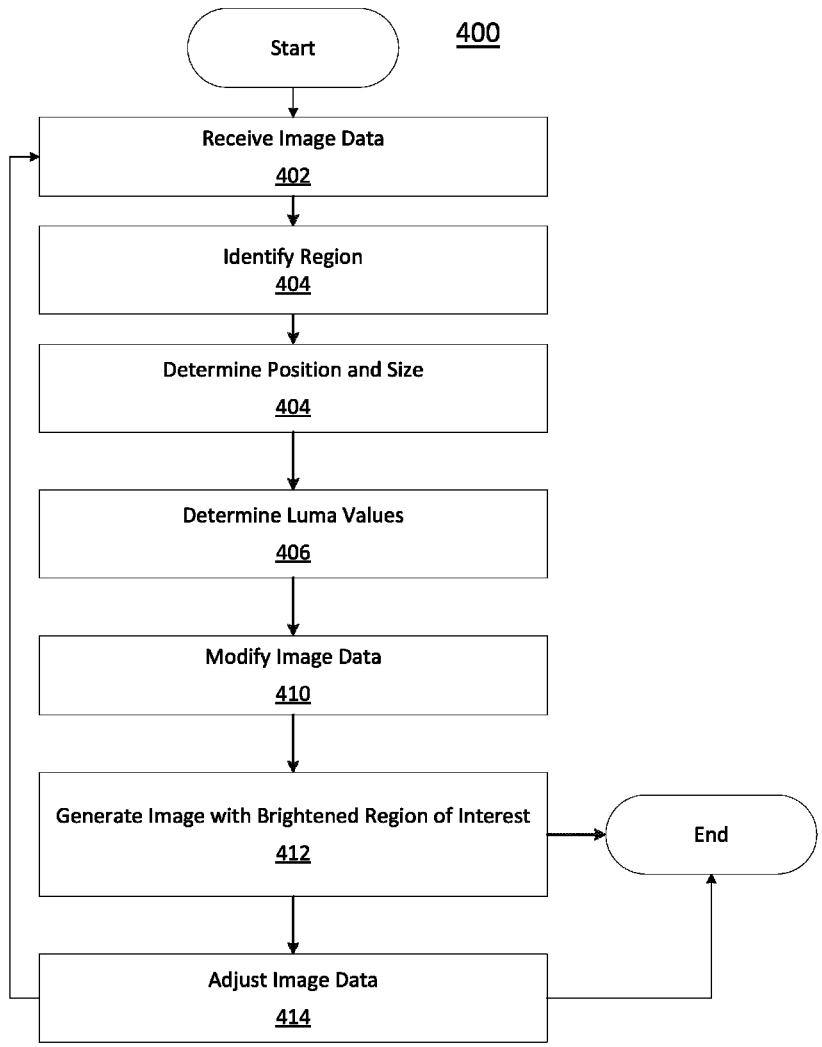
FIG. 4 depicts an exemplary method for modifying images to correct for backlighting in accordance with an embodiment of this disclosure.

FIG. 4 illustrates an exemplary method 400 of correcting images to compensate for backlighting. The method begins by receiving 402 image data. The image data can correspond to an image captured by a camera, or to previously modified image, for example. The method 400 can then proceed to detect 404 a region of interest within the image. The region can correspond to a facial region, an upper body or other suitable object. The position and size of the region of interest are then determined 404. The luma values of the region are then determined 406. The method 400 can then determine whether to brighten the region of interest, based at least in part on the determined 406 luma values. The determination of whether to modify the image can also be based on chroma values of the region, for example. The method 400 then, if appropriate, modifies 410 the received image data to produce 412 a modified image in which the region of interest has been brightened. The modified image can be rendered on a display of an electronic device. The modified image can be encoded and sent to far-end recipient, and rendered on a display of an electronic device remote from the camera. The method 400 can end, or the image data can be adjusted 414 and a revised image produced. The revised image can be rendered on a display of an electronic device, which can, again be local or remote to the camera that captured the image. The method 400 can end, or the revised image can then be reprocessed as described in blocks 402-404.

Aspects of the methods and systems set forth above are described in greater detail below. At least one algorithm of this disclosure can be directed to a 4:2:0 YCbCr image, (in this example the luma has twice the resolution of chroma in both the horizontal and vertical directions). To describe a small part of the image, there is one Cb value, one Cr value and a 2-by-2 square of Y values. For each such tiny picture component, one brightening value is computed (a Scale). While it is possible to modify only the luma values, this can lead to undesirable picture quality. Increasing luma values without changing chroma values can result in a washed-out picture. The adjustment added to each component can be calculated using the following equations:

$$\text{Chroma Adjustment} = \text{Scale}*(\text{Original}-128) \quad (2)$$

$$\text{Luma Adjustment} = \text{Scale}*(\text{Original}-16) \quad (3)$$

In equations 2 and 3, Original is the original luma or chroma value. If the computed value is outside the range [0, 255], it is replaced by the nearest value in this range. If a computed luma value exceeds 255 and it will be replaced by 255. This would mean that region would not not brightened as much as would have been in the absence of clipping. Clipping means that the brightening process can be carried out in a much less computationally expensive than would otherwise be the case. Similarly, rather than try to compute the exact amount by which chroma should be strengthened, it is more efficient to not strengthen a chroma value if its corresponding luma value is forced into range.

If the luminance for a region is high, there is no need to increase it in order to be at a visually pleasing level. Similarly, brightening parts of the picture that are already bright can cause saturation, meaning that all luma values in that part of the picture become 255. Consequently, the amount of brightening applied should depend on the preexisting luma level. However, setting the amount of brightening to be applied to an individual luma value depending on the present luma value can decrease contrast, which is undesirable. Rather, brightening can be applied based on the average luma value in the neighborhood of the individual. For example, for each 2-by-2 square of luma, the brightening can depend on the average luma value in an 8-by-8 square centered on the 2-by-2 region. 'Scale' of equations 2 and 3 above can be calculated according to equation 4 below.

$$\text{Scale} = K*(255-\max(M,\text{Average})) \quad (4)$$

In equation 4, K and M are constants (for a given image, though they can change from image to image), max(a,b) is the maximum of a and b and Average is the average of the 8-by-8 block. The purpose of using max(M,Average) instead of just Average is to limit Scale.

Brightening a facial region can include brightening a face as well as the area immediately surrounding the face. This method can be useful when the face detector is somewhat imprecise. Instead of precisely describing the face's contour, a rectangle which includes part of the face and as well as part of the background may be provided. Other shapes may be used to capture the region of interest, such as an oval or other suitable polygon. In these instances, it can be beneficial to brighten a region that includes all of the face and a minimal amount of the background.

As noted above, it can be undesirable to apply a constant level of brightening to a certain region, whatever its shape, but do not apply any brightening to the rest of the picture. The brightening can be very noticeable as a result. A goal of at least one embodiment of this disclosure is to have brightening occur without the viewer's notice. Because the output of a face detector (device and/or algorithm) can be imprecise and vary from frame to frame, even when the subject is still, a noticeable boundary between the brightened and brightened regions in an image is desirable. In order to achieve this, the amount of brightening is made to taper away gradually. For purpose of understanding, the part of the picture with full brightening can be referred to as the "central zone" and the part with tapering can be called the "transition zone".

Equation 5, shown below, is an example function which can be used to smoothen the brightening from the central zone through the transition zone.

$$\text{Attenuation} = [1+\cos(PI*x/w)]/2 \quad (5)$$

In addition to using the average luma values in the 8-by-8 blocks, the attenuation function depends on screen position. The attenuation function has a value of 1 for the central zone and slowly drops away to zero on either side. The attenuation function has a continuous derivative. Equation 5 can be seen to use a raised cosine function, which has a continuous derivative. In this example, W is the width of the transition region. The function can also be applied above and below the central zone. Thus, the attenuation function is a product of one function of x (horizontal) and one function of y (vertical).

In this example, the left and right boundaries of the central zone are parabolas. Together, the left and right boundaries produce a shape like a football with the points at the top and the bottom. The equations for the two boundaries are given by $$x = L + C*\text{square}(y-M) \quad (6)$$

$$x = R - C*\text{square}(Y-M) \quad (7)$$

where L, R, C and M are constants and square(z)=z*z. The other boundaries of the transition zone are given by:

$$x = L + C*\text{square}(y-M) - W \quad (8)$$

$$x = R - C*\text{square}(y-M) + W \quad (9)$$

Thus, one factor of the attenuation function depends on x and y. The other factor depends only on y. W represents the width of the transition zone, and can be set as appropriate, such as a certain fraction of the picture/image containing the region being brightened. After applying both attenuation factors, the central zone has parabolic borders on the left and right and horizontal borders on the top and bottom. If the transition is gradual enough, the viewer should not be able to determine the shape of the central zone.

As noted above, algorithms of this disclosure can be directed to two values: "Actual" and "Desired." In one embodiment, "Actual" is an actual luma value, perhaps the average value for a detected face. "Desired" is the luma value that will result in a more useful image. K (see below) is computed so an input value of Actual results in an output value of Desired. Based on a luma increment of Scale* (Original-16), the following equations apply:

$$\text{Desired} = \text{Actual} + \text{Scale}*(\text{Actual}-16) \quad (10)$$

Solving equation 10 for Scale yields:

$$\text{Scale} = (\text{Desired}-\text{Actual})/(\text{Actual}-16) \quad (11)$$

Assuming M is less than Desired, Scale=K*(255−max(M, Actual)) simpliflies to:

$$\text{Scale} = K*(255-\text{Actual}) \quad (12)$$

Solving equation 12 for K yields:

$$K = \text{Scale}/(255-\text{Actual}) \quad (13)$$

The values L, R, C and M determine what part of the picture gets brightened, thus they can be set according to what part of the image needs to be brightened. Based on the output of the face detector, it can be determined that the part of the image given by x in [L,R] and y in [T,B], (T meaning top, and B meaning bottom). In the foregoing equations, M is the middle of the vertical range, so it is the average of T and B. The value for C can be selected so that the two parabolas making up the left and right boundaries meet when y is either (T−W) or (B+w).

When operating in YUV video format, as noted above, Y is the brightness (luma). In this example, Y has range of zero to 255, (see FIG. 3) The value of IdealY of block 305 in FIG. 3 is 128. In blocks 307 and 308 of FIG. 3, the value AdjustmentY can be calculated using code such as that shown below:

```
float fAdjustment = 0.0f;
if(m_stDFCContext.fAfterBrighteningSmoothedAvgY >
(IDEAL_FACE_AREA_Y_VALUE + 35.0f))
{
fAdjustment = (m_stDFCContext.fAfterBrighteningSmoothedAvgY −
(IDEAL_FACE_AREA_Y_VALUE + 35.0f));
fSmoothFactor = 0.15;//0.005f;//0.15/30.0;
m_fBrightnessAdjustment = m_fBrightnessAdjustment *
(1.0f − fSmoothFactor) + fAdjustment * fSmoothFactor; }
```

In accordance with this example, if the brightness after brightening is 35 or more over the ideal level (IDEAL_FACE_AREA_Y_VALUE), an adjustment is provided to prevent saturation (over exposure). The value for "m_fBrightnessAdjustment" in the above code is calculated as:

$$m\_fBrightnessAdjustment = m\_fBrightnessAdjustment*(1.0f\text{-}fSmoothFactor) + fAdjustment*fSmoothFactor \quad (14)$$

Equation 14 uses an exponential moving average to get to a smoothed version of fAdjustment to avoid any noticeable changes. The smoothing factor is constant derived based on extensive testing. In equation 14, the smaller the smoothing factor (fSmoothFactor) the longer it will take to transition to the targeted value. On the other hand, if the smoothfactor is too great, the change in brightness level can be noticeable by a viewer.

The averaged actual final Y can then be adjusted to yield fFinalY, which can then be scaled by 2.5f, thus producing the desired Y. In this example, the Y value is "boosted" by a factor 2.5 times, and capped at IDEAL_FACE_AREA_Y_VALUE).

Various modifications, extensions, and changes to the systems and algorithms described herein may be implemented without departing from the scope of the present invention. Additionally, the various algorithms described herein may be implemented in hardware, software, firmware, or any combination thereof.

The technology of this disclosure can take the forms of hardware, or both hardware and software elements. In some implementations, the technology is implemented in software, which includes but is not limited to firmware, resident software, microcode, a Field Programmable Gate Array (FPGA) or Application-Specific Integrated Circuit (ASIC), etc. In particular, for real-time or near real-time use, an FPGA or ASIC implementation is desirable. Furthermore, the technology of this disclosure can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums as signal carriers per se are not included in the definition of physical computer-readable medium). Examples of a physical computer-readable medium include a semiconductor or solid state memory, removable memory connected via USB, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD, and Blu Ray™.

A data processing system suitable for storing a computer program product of the present technology and for executing the program code of the computer program product will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem, WiFi, and Ethernet cards are just a few of the currently available types of network adapters. Such systems can be centralized or distributed, e.g., in peer-to-peer and client/server configurations. In some implementations, the data processing system is implemented using one or both of FPGAs and ASICs.

The above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

We claim:

1. A computer-implemented method of correcting for backlighting in images on a display device, the method comprising:
    receiving, at a processor, image data corresponding to at least one image captured by a camera;
    detecting, by the processor, a region of interest within the image;
    determining, by the processor, a position and size of the region of interest within the image;
    determining, by the processor, luma values within the region of interest;
    determining, by the processor, whether to brighten the region of interest, based at least in part on the determined luma values, comparing the determined luma values to preset luma values, and comparing the captured image to a plurality of previously captured images;
    revising, by the processor, upon such determination, at least some of the luma values of the received image data to brighten the region of interest, wherein revising comprises temporal smoothing of the brightening with regard to feedback associated with adjustments made to the previously captured images;
    blending, by the processor, the brightened region of interest with the remainder of the image to produce a modified image, wherein blending comprises spatially smoothing the brightening from a central zone of the region of interest through a transition zone, using a raised cosine function having a continuous derivative; and displaying, under control of the processor, the modified image on a display device.

2. The computer-implemented method of claim 1, further comprising correcting for oversaturation by:

determining a brightness corresponding to the region of interest within the modified image;

determining adjustment values for the region of interest, based on the determined brightness; and generating a non-oversaturated second modified image, based at least in part on the luma and adjustment values.

3. The computer-implemented method of claim 1, wherein the region of interest corresponds to an upper body region of a person, a head region of a person, or an object, and wherein determining, by the processor, whether to brighten the region of interest, is further based at least in part on identifying the most common luma value within the region of interest using a histogram.

4. The computer-implemented method of claim 2, wherein the region of interest corresponds to a facial region.

5. The computer-implemented method of claim 4, wherein detecting the region of interest corresponding to the facial region includes comparing visual information with at least one of audio information and motion information.

6. The computer-implemented method of claim 1, wherein modifying the region of interest includes multiplying the luma values and chroma values within the region of interest by a predetermined scaling factor.

7. The computer-implemented method of claim 6, wherein the predetermined scaling factor is attenuated for at least one area of the region of interest in correspondence with a distance of the area from a central part of the region of interest.

8. A videoconferencing system, the system comprising:

at least one processor, at least one camera in signal communication with the processor;

at least one display device;

at least one non-transitory computer readable storage medium in signal communication with the processor; and at least one program module, stored on the non-transitory computer readable storage medium and operable, upon execution by the processor, to:

receive image data corresponding to at least one image captured by the camera;

detect a region of interest within the image;

determine a position and size of the region of interest within the image;

determine luma values within the region of interest;

determine, at a first time, whether to brighten the region of interest, based at least in part on the determined luma values;

adjust, based at least in part on the determination at the first time, at least some of the luma values of the received image data to brighten the region of interest, wherein adjusting comprises temporal smoothing of the brightening based on feedback associated with adjustments made to one or more previously captured images containing the region of interest;

determine whether any of the adjusted luma values were clipped during adjustment;

adjust chroma values in correspondence with those adjusted luma values that were not clipped;

blend the brightened region of interest with the remainder of the image to produce a modified image, wherein blending comprises spatially smoothing the brightening from a central zone of the region of interest through a transition zone using a raised cosine function having a continuous derivative;

access image data corresponding to the modified image;

detect a second region of interest within the modified image;

determine a second position and size of the second region of interest within the modified image;

determine luma values within the second region of interest;

determine, at a second time, whether to brighten the second region of interest, based at least in part on the determined luma values;

adjust, based at least in part on such second determination, at least some of the luma values of the accessed image data to darken the second region of interest, wherein adjusting comprises temporal smoothing of the darkening of the second region of interest, based on feedback associated with the adjustments made to the captured image;

blend the second region of interest with the remainder of the image to produce a second modified image, wherein blending comprises spatially smoothing the darkening from a central zone of the second region of interest through a second transition zone using a second raised cosine function having a continuous derivative; and render the second modified image using the display device.

9. The videoconferencing system of claim 8, wherein the at least one program module is further operable to:

determine a brightness corresponding to the second region of interest within the second modified image;

determine adjustment values for the second region of interest, based on the determined brightness;

sum the determined luma values and the adjustment values;

generate a third modified image, based at least in part on the summed luma and adjustment values; and render the third modified image on the display device.

10. The videoconferencing system of claim 9, wherein the second region of interest corresponds to an upper body region of a person, a head region of a person, or an object.

11. The videoconferencing system of claim 9, wherein the second region of interest corresponds to a facial region.

12. The videoconferencing system of claim 11, wherein detecting the second region of interest corresponding to the facial region includes comparing visual information with at least one of audio information and motion information.

13. The videoconferencing system of claim 8, wherein modifying the second region of interest includes multiplying the luma values and chroma values within the second region of interest by a predetermined scaling factor.

14. The videoconferencing system of claim 13, wherein the predetermined scaling factor is attenuated for at least one area of the region of interest in correspondence with a distance of the area from a central part of the second region of interest.

15. A non-transitory computer readable storage medium storing instructions, executable by at least one processor, which upon execution, cause the processor to:

receive image data corresponding to at least one image;

detect a region of interest within the image;

determine a position and size of the region of interest within the image;

determine luma values within the region of interest;

determine whether to brighten the region of interest, based at least in part on the determined luma values;

revise, upon such determination, at least some individual luma values of the received image data based at least in part, on the determined luma values neighboring each of the individual luma values, to brighten the region of interest;

blend the brightened region of interest with the remainder of the image to produce a modified image, wherein blending comprises spatially smoothing the brightening from a central zone of the region of interest through a transition zone using a raised cosine function having a continuous derivative; and render the modified image on a display device.

16. The non-transitory computer readable storage medium of claim 15, further storing instructions to cause the processor to:

determine a brightness corresponding to the region of interest within the modified image;

determine adjustment values for the region of interest, based on the determined brightness; and generate a second modified image, based at least in part on a comparison of the determined luma values with the adjustment values.

17. The non-transitory computer readable storage medium of claim 16, wherein the region of interest corresponds to an upper body region of a person, a head region of a person, or an object.

18. The non-transitory computer readable storage medium of claim 16, wherein the region of interest corresponds to a facial region.

19. The non-transitory computer readable storage medium of claim 18, wherein detecting the region of interest corresponding to the facial region includes comparing visual information with at least one of audio information and motion information.

20. The non-transitory computer readable storage medium of claim 15, wherein revising individual luma values based at least in part on the determined luma values neighboring each of the individual luma values, comprises revising 2-by-2 regions of luma based on an average luma value in an 8-by-8 square centered on each of the 2-by-2 regions.

21. The non-transitory computer readable storage medium of claim 20, wherein the predetermined scaling factor is attenuated for at least one area of the region of interest in correspondence with a distance of the area from a central part of the region of interest.

* * * * *